US012770979B2

(12) United States Patent
Mizusawa et al.

(10) Patent No.: US 12,770,979 B2
(45) Date of Patent: Oct. 20, 2026

(54) HIGH VOLTAGE THREE-TAB ELECTRICAL ACCUMULATORS

(71) Applicant: AC BIODE S.À R.L. (A CORPORATION OF LUXEMBOURG), Hesperange (LU)

(72) Inventors: Atsushi Mizusawa, Kyoto (JP); Yasuo Yukita, Mobara (JP)

(73) Assignee: AC BIODE S.À.R.L. (a corporation of LUXEMBOURG), Hesperange (LU)

( * ) Notice: Subject to any disclaimer, the term of this patent is extended or adjusted under 35 U.S.C. 154(b) by 833 days.

(21) Appl. No.: 18/031,204

(22) PCT Filed: Oct. 14, 2020

(86) PCT No.: PCT/EP2020/078941
§ 371 (c)(1),
(2) Date: Apr. 11, 2023

(87) PCT Pub. No.: WO2022/078595
PCT Pub. Date: Apr. 21, 2022

(65) Prior Publication Data
US 2023/0420806 A1 Dec. 28, 2023

(51) Int. Cl.
*H01M 50/502* (2021.01)
*H01M 10/04* (2006.01)
*H01M 10/44* (2006.01)
*H01M 50/543* (2021.01)

(52) U.S. Cl.
CPC ..... *H01M 50/502* (2021.01); *H01M 10/0445* (2013.01); *H01M 10/441* (2013.01); *H01M 50/543* (2021.01)

(58) Field of Classification Search
CPC .......... H01M 50/502; H01M 10/0445; H01M 10/441; H01M 50/543; Y02P 70/50; Y02E 60/10
See application file for complete search history.

(56) References Cited

FOREIGN PATENT DOCUMENTS

| | | | |
|---|---|---|---|
| CN | 104716377 | A | 6/2015 |
| JP | S53-92129 | U | 7/1978 |
| JP | 2016-171075 | A | 9/2016 |
| JP | 2016-178859 | A | 10/2016 |
| WO | 2021/204364 | A1 | 10/2021 |

OTHER PUBLICATIONS

International Search Report for PCT/EP2020/078941 dated Jul. 12, 2021.
Written Opinion for PCT/EP2020/078941 dated Jul. 12, 2021.
Communication issued Nov. 7, 2024 in Chinese application No. 202080103923.3.

*Primary Examiner* — Helen Oi K Conley
(74) *Attorney, Agent, or Firm* — Sughrue Mion, PLLC

(57) ABSTRACT

AC battery cells having in each three electrode tabs (terminals) which are anode, biode, and cathode are able to become a high voltage system by the connection of the biode tabs with the biode tabs one another or with the cathode tabs one another by using switches. At the same time, all tabs of anode are always connected one another. These connections of AC batteries give a high voltage between the cathode tab and the biode tab in the stable voltage between the biode and anode. Finally, this system is a high voltage electrical accumulator.

3 Claims, 7 Drawing Sheets

HIGH VOLTAGE THREE-TAB ELECTRICAL ACCUMULATORS

CROSS REFERENCE TO RELATED APPLICATIONS

This application is a National Stage of International Application No. PCT/EP2020/078941 filed on Oct. 14, 2020.

TECHNICAL FIELD

The present invention relates to rechargeable battery configurations capable of the alternating current and alternating power and a rechargeable battery system, a charger configured to charge the rechargeable battery system, and a discharger configured to discharge the rechargeable system.

BACKGROUND ART

Electrical power supply and usage have been optimized toward the highest efficiency by mixing with alternating-current power (AC) and direct-current power (DC) in an electrical circuit and a grid, an electrical power supply infrastructure.

Even though rechargeable (secondary) batteries are a significant electrical power supply, they historically have been developed and used just as a DC. There have been no prime ways to plan the maximal efficiency in the electrical circuits of mobile applications and the electrical power units of automobiles just because of DC secondary batteries.

In secondary batteries, a type that charges and discharges by AC is offered in Patent Literature1&2. This type of the rechargeable battery is called ‘AC battery,’ which gives various sights to design the best efficient plan of electrical circuits in many purposes. A single cell of AC battery has three tabs (terminals) which are anode, biode, and cathode. The electrode material potential sequence is (lower) anode<biode<cathode (higher). Biode works as a bipolar electrode through a switch circuit. And then the cell is able to be charged and discharged by AC (Patent Literature1&2).

The internal electrode configuration patterns of an AC battery single cell are extremely multihued and the same time mainly divided into two categories (Table). The left column of the Table shows the first category of the total number of electrodes is 4n+5 (n means an integer equal to or greater than zero). In this category, the three kind electrodes which are anode (A), biode (B), and cathode (C) are configured in symmetry. And still then, total 4n+5 electrodes are categorized two patterns that n+1 anode(s), 2n+2 biodes, and n+2 cathodes; n+2 anodes, 2n+2 biodes, and n+1 cathode(s). For example, at n=0, the total number of electrodes are five, and two electrode configuration patterns are existed: primarily, one anode (A), two biodes (B), and two cathodes (C) that is represented by CBACB as the electrode configuration which is showed as an example in the first row of the Table; next, two anodes (A), two biodes (B), one cathode (C) that is represented by ABCBA. Regardless of the number of n, the cell has just three tabs because of the internal contacts that are A-A- . . . , B-B- . . . , and C-C . . . .

Second category of the total number of electrodes is 4n+3 with n being an integer equal to or greater than zero is appeared at the right column of the Table. In this second category, the configuration patterns of the three kind electrodes which are anode (A), biode (B), cathode (C) are always asymmetric like ABC (n=0), ABCBABC(n=1), ABCBABCBABC(n=2), ABCBABCBABCBABC (n=3), . . . . When the integer n is equal to ‘1’, the same kind electrodes must be internally connected like A-A, B-B-B, C-C in the electrode configuration pattern ABCBABC(n=1) which is exampled in the second row of the Table.

The separators are necessarily put into between any electrodes and all cells include property electrolyte.

The switch to control the AC battery cells can have three connections: (1) anode-biode, (2) biode-cathode, (3) free which means there are no connections between any electrodes.

An AC battery discharge process is showed in FIG. 4. The AC battery cell is constructed by graphite ($C_6$) as the anode, lithium titan oxide ($Li_4Ti_5O_{12}$) as the biode, and lithium cobalt oxide ($LiCoO_2$) as the cathode. The initial step of the discharge starts with the connection between the anode and biode. The voltage marks minus(−) 1.37V like (a) in FIG. 4. And then the switch changes the connection between the cathode and biode. The voltage becomes plus(+) 2.33V like (b) in FIG. 4. The cell generates an alternating electrical power and current.

The discharge processes of AC battery are able to withdraw the maximum capacity of the cell. The reason why both potential the anode-biode and biode-cathode can be done at 0V. AC battery utilizes the maximum capacity 160 $mAhg^{-1}$ (FIG. 4) as the highest technical capacity of $LiCoO_2$, although the commercial lithium-ion batteries are able to discharge till the voltage 3V which means the available capacity 120-140 $mAhg^{-1}$.

The electrical collector which is copper foil of the commercial lithium-ion batteries (LIBs) dissolves if the voltage of anode ($C_6$)-cathode ($LiCoO_2$) falls to under 3V. This is the most dangerous thing for users of LIBs, because the batteries are highly likely to burn and blast.

The setting of the commercial lithium-ion battery which anode contacts to the cathode brings essentially the danger of explosion in the state of the voltage under 3V, because the $LiCoO_2$ cathode demands more electrons from the graphite anode which has no active electrons. In the result, the copper foil with the graphite dissolves to give electrons to the cathode. There are no methods to withhold the phenomenon.

On an AC battery system, the anode is connected with the biode at work. The anode is never connected with the cathode. Hence, AC battery is absolutely safe. The anode copper foil never dissolves at even 0V state of the system.

On the AC battery system which electrodes are graphite anode, $Li_4Ti_5O_{12}$ biode, and $LiCoO_2$ cathode, the anode has been maintained almost 0V (0-14.2 mV) 60 days at 60° C. There are no damages of the anode copper foil (FIG. 5). AC battery is absolutely safe.

CITATION LIST

Patent Literature

Patent Literature 1: JP 2016-171075 A

Patent Literature 2: WO 2021/204364 A1

SUMMARY OF INVENTION

Though the AC battery is a critically safe system, the voltages are crucially low comparing to the commercial LIBs. For an example, the plus voltage between $LiCoO_2$ cathode and $Li_4Ti_5O_{12}$ biode is normally 2.33V and minus voltage between the biode and graphite anode is just −1.37V on average, although the normal LIB voltage is 3.7V. This is the problem for applying various kinds of electrical circuits.

The advantage of AC batteries is the anode is absolutely stable by being connected with the biode at work.

AC battery cells having in each three electrode tabs (terminals) which are anode, biode, and cathode are able to become a high voltage system by the connection of the biode tabs with the biode tabs one another or with the cathode tabs one another by using switches. At the same time, all tabs of anode are always connected one another.

These connections of AC batteries give a high voltage between the cathode tab and the biode tab in the stable voltage between the biode and anode.

Finally, this system is a high voltage electrical accumulator.

A high voltage electrical accumulator of alternating current and power is realized in the situation of absolutely safe anode connected with biode. High voltage alternating current and power is needed to effectively product drones, e-bikes and EVs which are extremely safe.

DESCRIPTION OF EMBODIMENTS

Figure 1A:
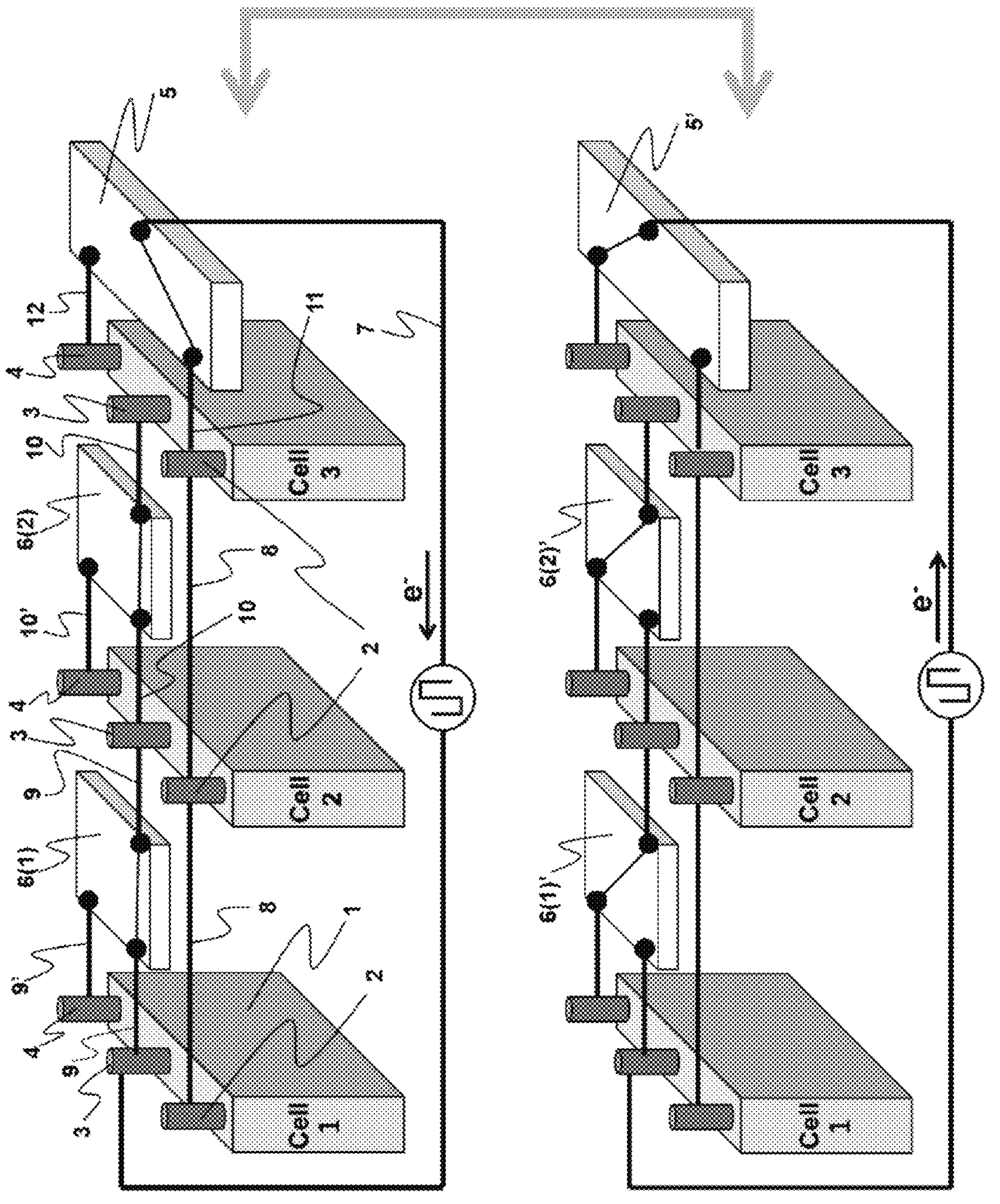
FIG. 1A is a configuration of three AC batteries and the contact electrical lines with four switches. The control circuit of the switches is not shown.
Figure 1B:
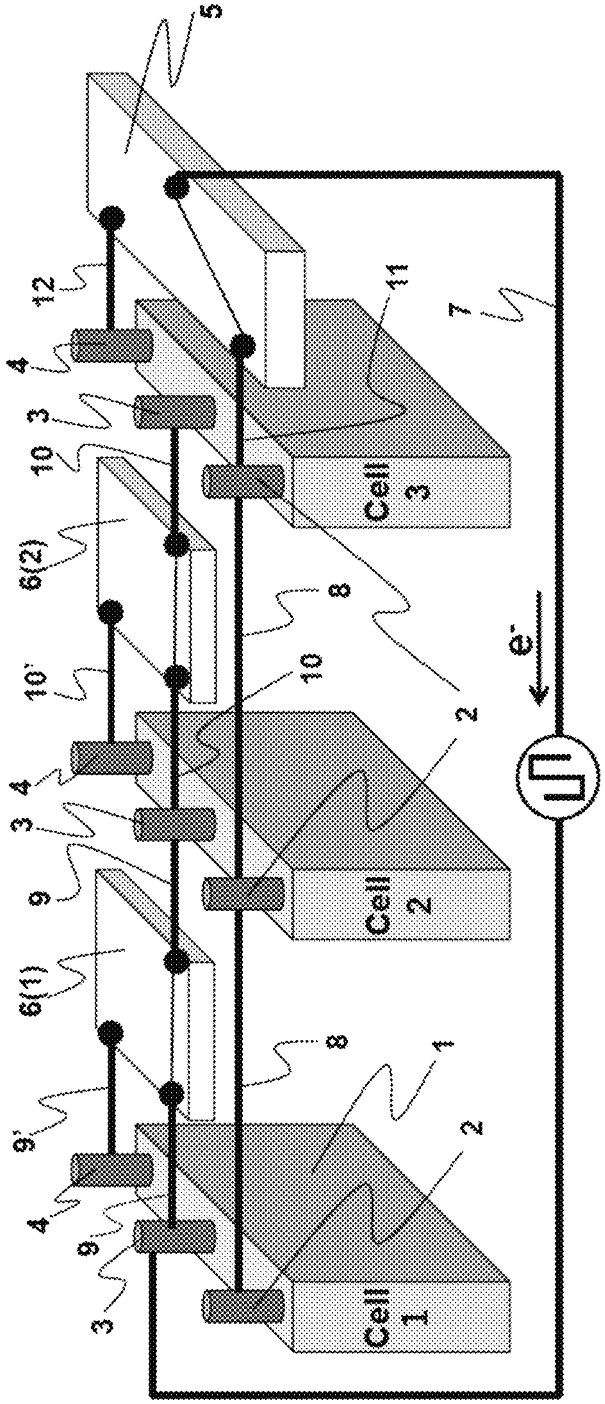
FIG. 1B is an upper configuration of three AC batteries and the contact electrical lines with four switches.
Figure 1C:
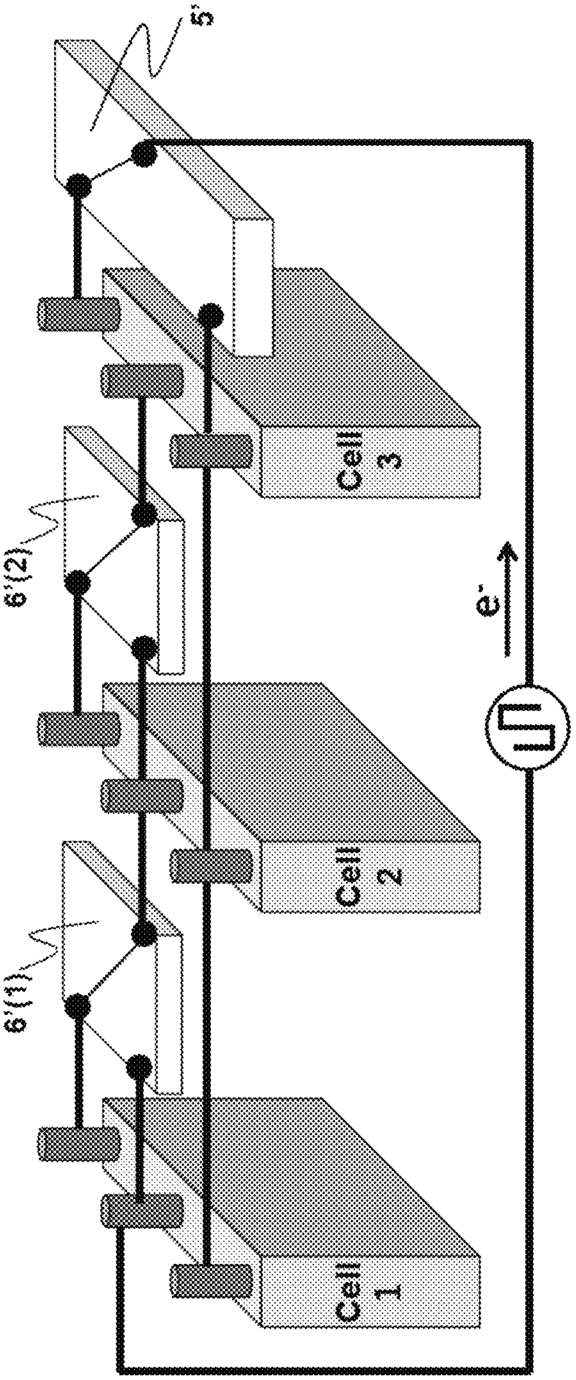
FIG. 1C is an under configuration of three AC batteries and the contact electrical lines with four switches.

In FIGS. 1A-1C, three AC batteries (Cell 1, Cell 2, Cell 3) are set up in the same direction. Each AC battery has three electrode tabs (terminals), which are an anode 2, a biode 3 working as a bipolar electrode, and a cathode 4. In FIG. 1 the following reference numbers are used: 1. Casing of a single cell of AC battery, 2. Anode tabs, 3. Biode tabs, 4. Cathode tabs, 5. Switch the position of Anode of Cell 3-Biode of Cell 1 in parallel, 5'. Switch the position of Biode of Cell 1-Cathode of Cell 3 in series 6(1),(2). Switch the position of Biode-Biode in parallel 6'(1), 6'(2). Switch the position of Biode-Cathode in series, 7. Cable between biode tab of Cell 1 and Switch 5, 8. Cable between Anodes, 9, 10. Cable between Biodes, 10'. Cable between cathode tab of Cell 2 and switch 6(2), 11. Cable between anode tab of Cell 3 and switch 5, 12. Cable between cathode tab of Cell 3 and switch 5. In FIG. 1 the control circuit of the switches is not shown.

The anode tab on a casing 1 or others internally has n+1 or n+2 anode electrodes; and the biode tab on the casing 1 or others internally has 2n+2 biode electrodes; and the cathode tab on the casing 1 or others internally has n+2 or n+1, respectively, in the total number of electrodes 4n+5 (n is an integer equal to or greater than zero).

Or in the total number of electrodes are 4n+3 internally in a cell (n is an integer equal to or greater than zero), the anode tab on the casing 1 or others has n+1 anode electrode(s); and the biode tab on the casing 1 or others has 2n+1 biode electrode(s); and the cathode tab on the casing 1 or others has n+1 cathode electrode(s).

The three anode tabs of Cell 1, 2, 3 are connected in parallel with an electrical cable 8 and the tab of Cell 3 has a switch 5, 5' changing back and forth from the anode to the cathode.

The two biode tabs of Cell 1, 2 are connected with an electrical cable 9 through the intermediary of the switch 6(1), 6(1)' changing back and forth from the biodes of Cell 1,2 to the cathode of Cell 1 with the electrical cable 9'. And the two biode tabs of Cell 2, 3 are connected with an electrical cable 10 through the intermediary of switch 6(2), 6(2)' changing back and forth from the biodes of Cell 2,3 to the cathode of Cell 2 with the electrical cable 10'.

The biode tab of Cell 1 is connected with electrical cable of 7 to the switch 5, 5' changing back and forth from the anode of Cell 3 with an electrical cable 11 to the cathode of Cell 3 with an electrical cable 12.

In the discharge situation of three AC batteries of FIGS. 1A-1C, a twofold switching step makes an alternating current and power of a frequency, thus the switch 5 is firstly set in the connection between the biode tab of Cell 1 and the anode tab of Cell 3 and secondarily the changed switch 5' connects the biode tab of Cell 1 with the cathode tab Cell 3. At the same time, the switch 5 synchronizes the switch 6(1) and 6(2) which turn the positions of biode-biode tabs into biode-cathode tabs showed as the switch 6(1)' and 6(2)'.

A high voltage AC battery accumulator is made by m AC battery cells (m is an integer equal to or greater than 1) having in each three electrode tabs (terminals): the anode tab, biode tab, and cathode tab which all anode tabs are connected one another in parallel, and $m_{th}$ biode tab and $m_{th}$ cathode tab are contacted with the switch which is interposed between $m_{th}$ AC battery cell and $(m+1)_{th}$ cell and turns the contact of $m_{th}$ biode tab-$(m+1)_{th}$ biode tab into $m_{th}$ cathode tab-$(m+1)_{th}$ biode tab; $(m+1)_{th}$ is the last AC battery cell which anode tab and cathode tab have the switch frequently turns the contact of $(m+1)_{th}$ anode tab-first (m=1) biode tab into $(m+1)_{th}$ cathode tab-first (m=1) biode tab.

On the description above, the charge processes are given by the beginning from the switch connection of the cathode tab of the last $(m+1)_{th}$ AC battery cell with the biode tab of first (m=1) cell; then, the switch connection turns into the anode tab of $(m+1)_{th}$ cell with the biode tab of first (m=1) cell; and these processes are repeated continuously.

On the description, the discharge processes are given by the beginning from the switch connection of the anode tab of the last $(m+1)_{th}$ AC battery cell with the biode tab of first (m=1) cell; then, the switch connection turns into the cathode tab of $(m+1)_{th}$ cell with the biode tab of first (m=1) cell; and these processes are repeated continuously.

EXAMPLES

Example 1

Figure 2:
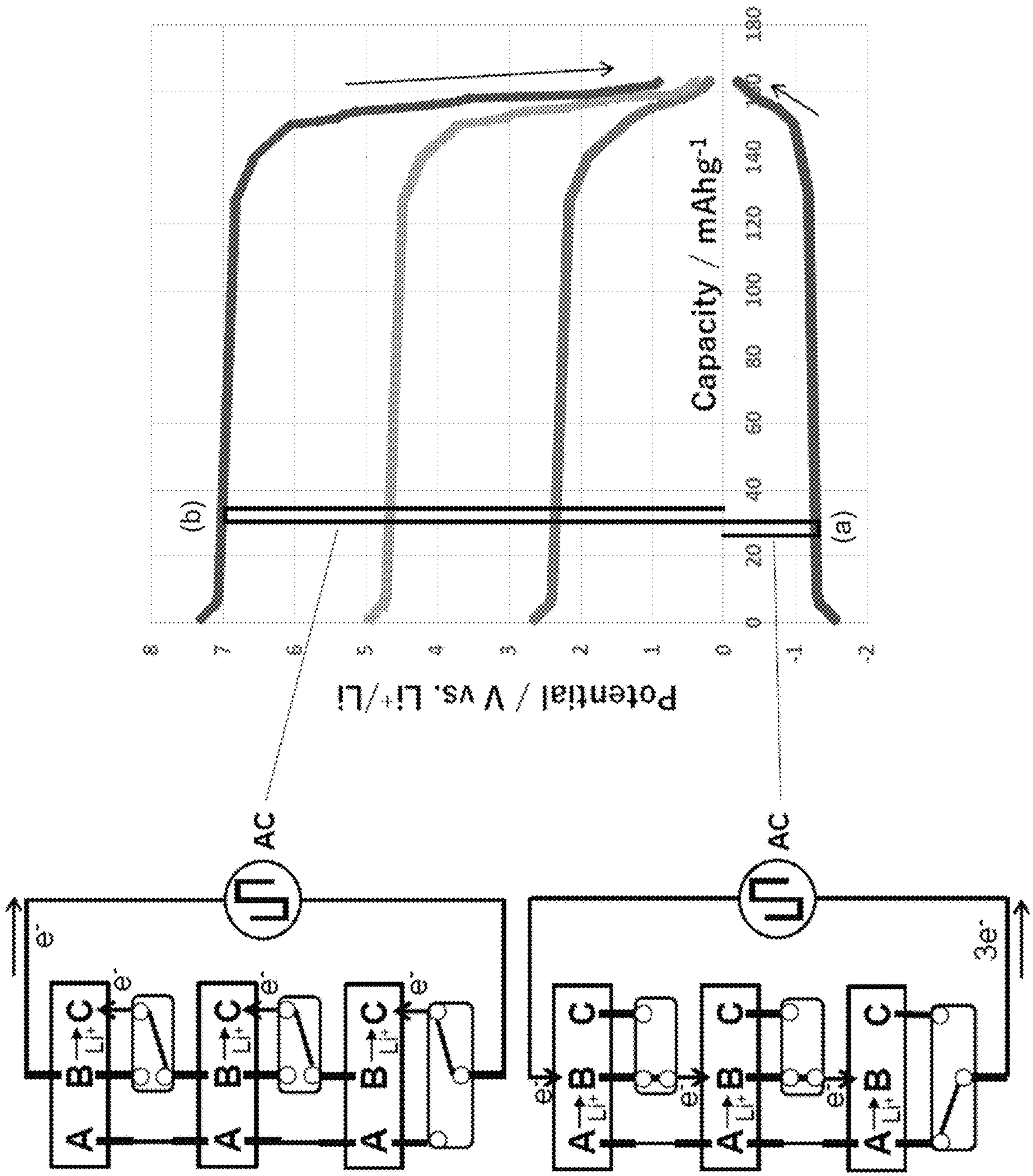
FIG. 2 is a discharge process and its graph of a configuration of three AC batteries with a graphite anode, a $Li_4Ti_5O_{12}$ biode, and a $LiCoO_2$ cathode. The control circuit of the switches is not shown.

In FIG. 2, triple AC battery system of a high voltage electrical accumulator which was a discharge process and its graph of a configuration of three AC batteries with a graphite anode, a $Li_4Ti_5O_{12}$ biode, and a $LiCoO_2$ cathode. The control circuit of the switches is not shown. In FIG. 2: A: anode; B: biode; C: cathode. In FIG. 2. switching between (b) 6.99V, 160 mAhg-1 on average and (a) −1.37V, 160 mAhg-1 on average.

The discharge process was able to be continued by the repeat of the twofold switching till the end of the cell capacity which means the system voltages both the anode-biode and biode-cathode are zero (FIG. 2).

The switches to control the AC battery cells can have three connections: (1) anode-biode, (2) biode-cathode, (3) free which means there are no connections between any electrodes.

Internal Electrode Configuration Patterns of AC Battery (Three Tab Battery Cell inner constructions)

| n | Total number of electrodes 4n + 5 [A = n + 1, B = 2n + 2, C = n + 2 or A = n + 2, B = 2n + 2, C = n + 1] | Total number of electrodes 4n + 3 (A = n + 1, B = 2n + 1, C = n + 1) |
|---|---|---|
| n = 0 | CBABC or ABCBA example: 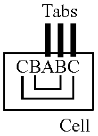  | ABC example: 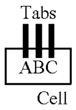  |
| n = 1 | CBABCBABC or ABCBABCBA | ABCBABC example: 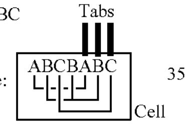  |
| n = 2 | CBABCBABCBABC or ABCBABCBABCBA | ABCBABCBABC |
| n = 3 | CBABCBABCBABCBABC or ABCBABCBABCBABCBA | ABCBABCBABCBABC |
| : | : | : |

A: anode; B: biode; C: cathode

Example 2

Figure 3:
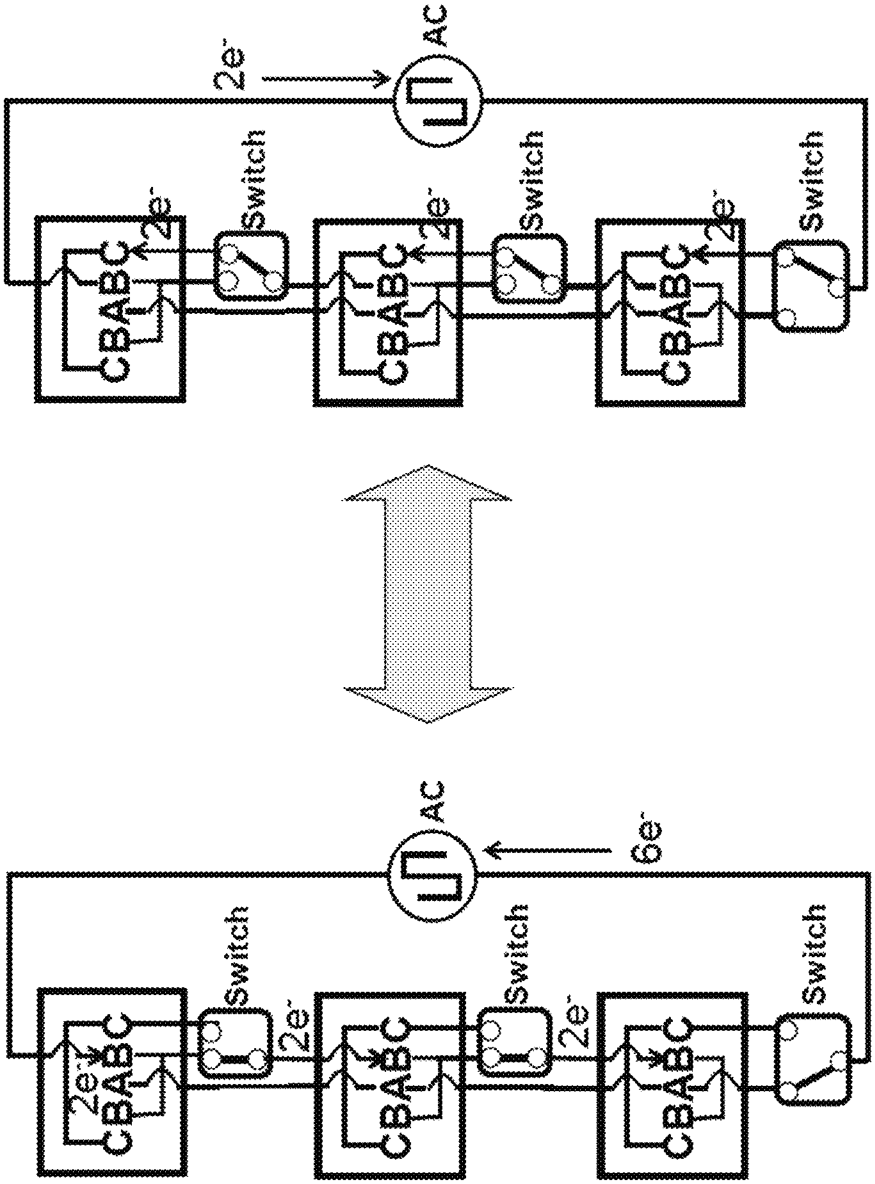
FIG. 3 is a discharge process and its graph of a configuration of three AC batteries with a graphite anode, two $Li_4Ti_5O_{12}$ biode, and two $LiCoO_2$ cathode. The control circuit of the switches is not shown.

In FIG. 3, triple AC battery system of a high voltage electrical accumulator which was a discharge process and its graph of a configuration of three AC batteries with a graphite anode, two $Li_4Ti_5O_{12}$ biode, and two $LiCoO_2$ cathode. The control circuit of the switches is not shown. In FIG. 3: A: anode; B: biode; C: cathode. In FIG. 3 switching between −1.37V, 320 mAhg-1 on average (left side) and 6.99V, 320 mAhg-1 on average (right side).

The switches to control the AC battery cells can have three connections: (1) anode-biode, (2) biode-cathode, (3) free which means there are no connections between any electrodes.

Comparative Example 3

Figure 4:
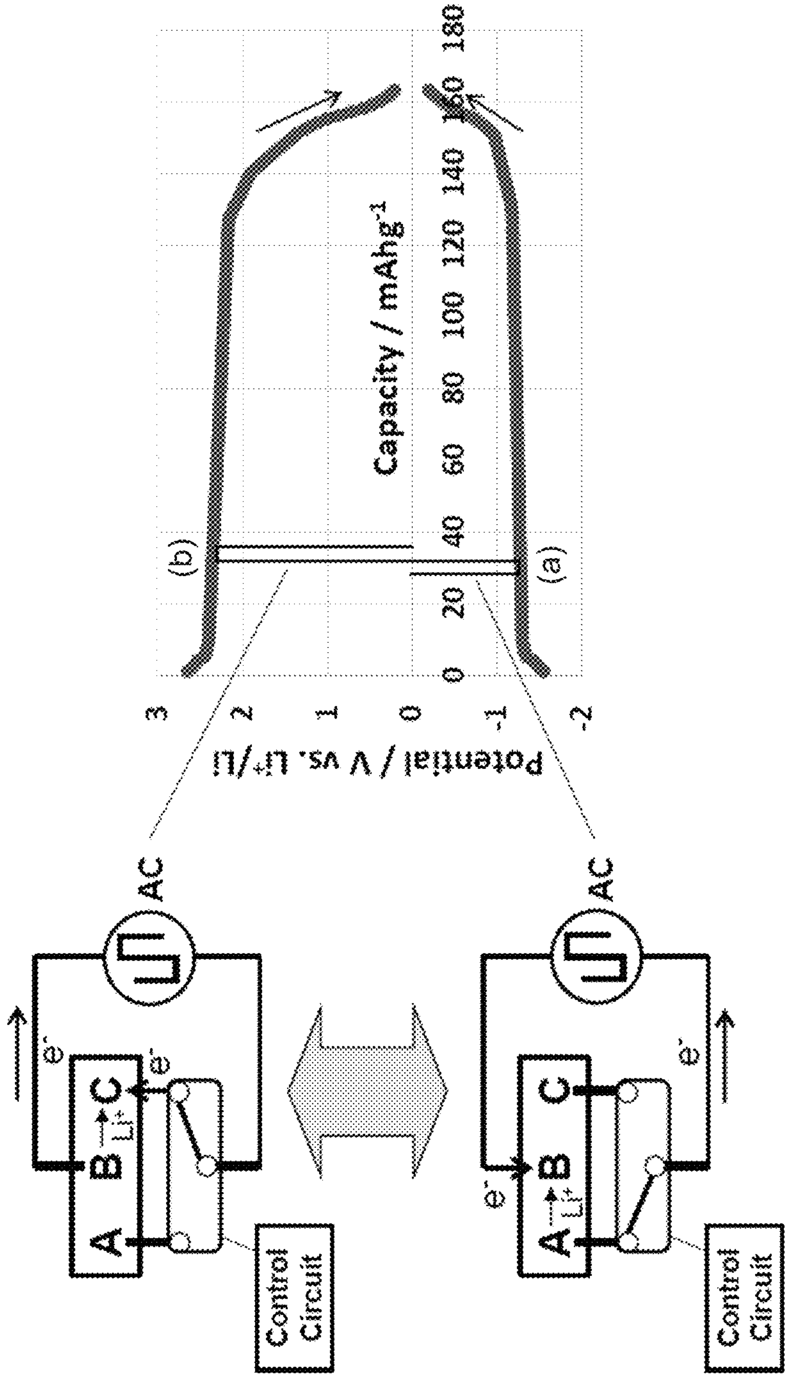
FIG. 4 is a discharge process and its graph of a configuration of a single AC battery with a graphite anode, a $Li_4Ti_5O_{12}$ biode, and a $LiCoO_2$ cathode. The control circuit of the switches is not shown.

In FIG. 4, an AC battery system of a normal voltage electrical accumulator which was a discharge process and its graph of a configuration of a single AC battery with a graphite anode, a $Li_4Ti_5O_{12}$ biode, and a $LiCoO_2$ cathode. The control circuit of the switches is not shown. In FIG. 4: A: Graphite anode; B: $Li_4Ti_5O_{12}$ biode; C: $LiCoO_2$ cathode. In FIG. 4 switching between (b) 2.33V, 160 mAhg-1 on average (upper side) and (a) −1.37V, 160 mAhg-1 on average (lower side).

The discharge process was able to be continued by the repeat of the twofold switching till the end of the full capacity which means the system voltages both the anode-biode and biode-cathode are zero (FIG. 4).

Figure 5:
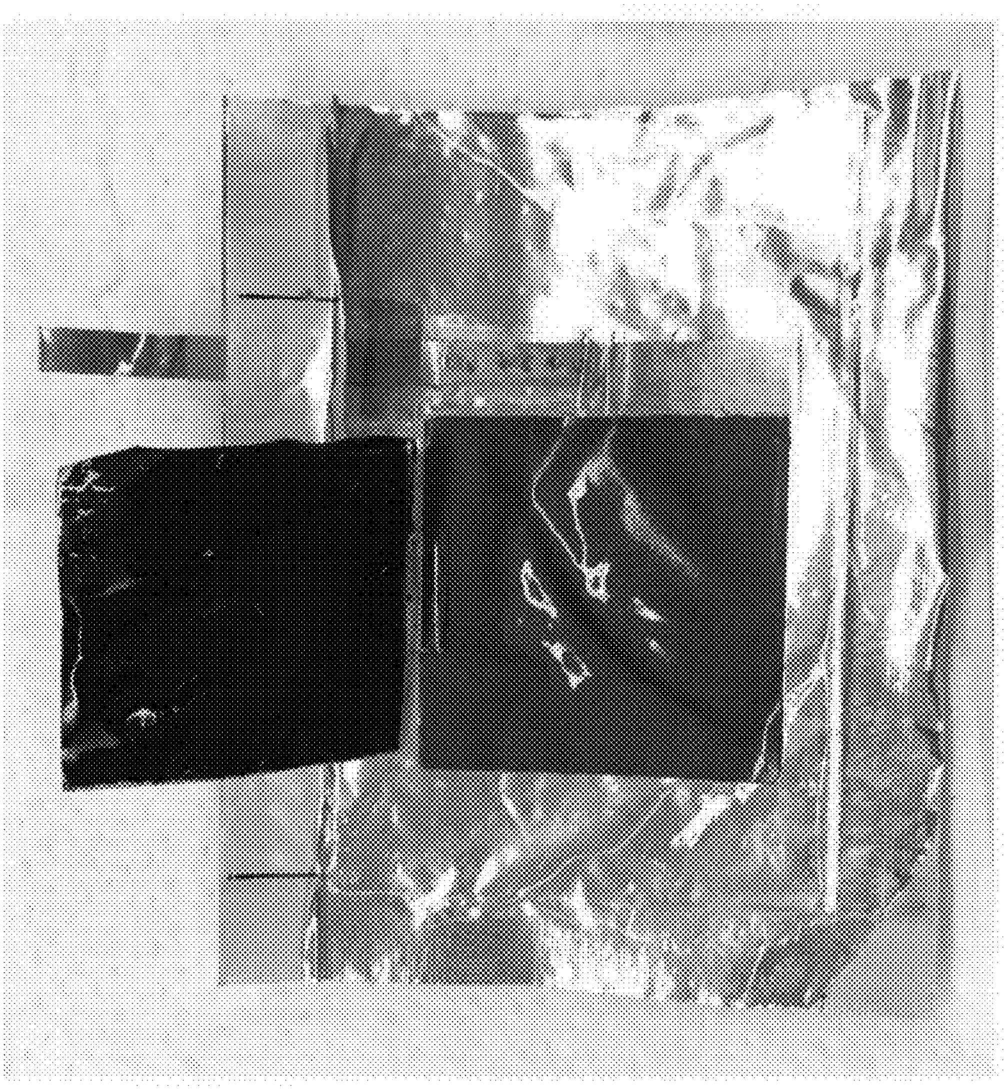
FIG. 5 is a photograph of the surface of a graphite anode after the process of being maintained 0-14.2 mV, 60 days at 60° C. There are no damages of the anode copper foil of AC battery system which electrodes are graphite anode, $Li_4Ti_5O_{12}$ biode, and $LiCoO_2$ cathode.

In FIG. 5, a single AC battery with a graphite anode, a $Li_4Ti_5O_{12}$ biode, and a $LiCoO_2$ cathode was deconstructed to be observed about the anode aspect after the voltage support 0-14.2 mV, 60 days at 60° C. There are no damages of the anode copper foil of AC battery cell (60° C., 60 days, 14.2 mV→0 mV).

The invention claimed is:

1. A high voltage AC battery accumulator comprising:

at least three AC battery cells; and at least three switches, wherein the at least three AC battery cells comprise a first AC battery cell, a second AC battery cell, and a third AC battery cell;

the at least three switches comprise a first switch, a second switch, and a third switch;

each of the at least three AC battery cells has an anode tab, a biode tab, and a cathode tab, each of the at least three switches has three terminals, the anode tab of the second AC battery cell is connected with the anode tab of the third AC battery cell, and the anode tab of the third AC battery cell is connected with a terminal of the third switch, the biode tab of the second AC battery cell is connected with a first terminal of the second switch, and the cathode tab of the second AC battery cell is connected with a second terminal of the second switch, the second switch being interposed between the second AC battery cell and the third AC battery cell, the biode tab of the third AC battery cell is connected with a third terminal of the second switch, and the biode tab of the first AC battery cell is connected with a terminal of the third switch, and the at least three switches are configured to be frequently and alternatively switched between a first connection state and a second connection state, where in the first connection state, the second switch connects the biode tab of the second AC battery cell with the biode tab of the third AC battery cell, and the third switch connects the anode tab of the third AC battery cell with the biode tab of the first AC battery cell, and in the second connection state, the second switch connects the cathode tab of the second AC battery cell with the biode tab of the third AC battery cell, and the third switch connects the cathode tab of the third AC battery cell with the biode tab of the first AC battery cell.

2. A charge process for a high voltage AC battery accumulator according to claim 1, starting from the second connection state, the at least three switches are configured to be switched to the first connection state and then to be continuously switched between the first connection state and the second connection state.

3. A discharge process for a high voltage AC battery accumulator according to claim 1, beginning from the first connection state, the at least three switches are configured to be switched to the second connection state and then to be continuously switched between the second connection state and the first connection state.

* * * * *